United States Patent [19]

Seiden et al.

[11] Patent Number: 4,680,184
[45] Date of Patent: Jul. 14, 1987

[54] EMULSIFIER FORMULATION FOR COOKIES

[75] Inventors: Paul Seiden; Martin A. Mishkin, both of Cincinnati, Ohio

[73] Assignee: The Procter & Gamble Company, Cincinnati, Ohio

[21] Appl. No.: 722,927

[22] Filed: Apr. 12, 1985

[51] Int. Cl.$^4$ ........................ A23L 1/035; B01F 17/00
[52] U.S. Cl. .................................. 426/654; 426/549; 426/103; 426/94
[58] Field of Search ................ 426/94, 103, 549, 560, 426/601, 653, 654

[56] References Cited

U.S. PATENT DOCUMENTS

| | | |
|---|---|---|
| 2,689,797 | 9/1954 | Joffe . |
| 3,216,829 | 11/1965 | Hansen . |
| 3,268,337 | 8/1966 | Howard et al. . |
| 3,443,965 | 5/1969 | Birnbaum . |
| 3,502,482 | 3/1970 | Birnbaum . |
| 4,360,534 | 11/1982 | Brabbs et al. ........................ 426/560 |
| 4,455,333 | 6/1984 | Hong et al. ............................ 426/94 |
| 4,503,080 | 3/1985 | Brabbs et al. ........................ 426/94 |

OTHER PUBLICATIONS

Hutchinson, P. E. et al., "Effect of Emulsifiers on the Texture of Cookies", Journal of Food Science, 42(2), pp. 399–401, 1977.
Carden et al., Baker's Digest, "Margarine for Baking", 58–60, Apr. 1970.
Rusch, D. T., "Emulsifiers: Use in Cereal and Bakery Foods", Cereal Foods World, 26(3), pp. 110–113, 115, (1975).

Primary Examiner—Robert Yoncoskie
Attorney, Agent, or Firm—Rose Ann Dabek; Julius P. Filcik; Richard C. Witte

[57] ABSTRACT

The present invention is an emulsifier system for cookies comprising:
  (a) from about 40% to about 100% (by weight, on the basis of monoglyceride content) fatty acid mono-diglycerides, said mono-diglycerides having from about 35% to about 99% fatty acid mono-glycerides, and from about 1% to about 50% fatty acid diglycerides, wherein at least about 65% of said fatty acids are selected from the group consisting of $C_{14}$–$C_{20}$ saturated fatty acids and $C_{16}$–$C_{20}$ trans-unsaturated fatty acids and mixtures thereof;
  (b) from about 0% to about 60% (by weight) fatty acid esters of polyols having an average of from about 4 to about 14 hydroxyl groups, wherein from about 10% to about 66% of the hydroxyl groups are esterified, wherein at least about 65% of said fatty acids are selected from the group consisting of $C_{14}$–$C_{20}$ saturated fatty acids and $C_{16}$–$C_{20}$ trans-unsaturated fatty acids and mixtures thereof; and
  (c) from about 0% to about 60% (by weight) fatty acid mono-glyceride esters of polycarboxylic acids and their derivatives, wherein at least about 65% of said fatty acids are $C_{14}$–$C_{20}$ saturated fatty acids.

18 Claims, No Drawings

EMULSIFIER FORMULATION FOR COOKIES

TECHNICAL FIELD

The present invention relates to an emulsifier system for use in cookies, and particularly for use in improved storage-stable crumb-continuous dual-textured cookies. This emulsifier system provides texture, flavor, and appearance advantages in the cookies.

BACKGROUND ART

A number of problems may be encountered in the making of cookies. The dough formation and baking steps can cause the cookies to become too hard and tough, or to contain off-flavors. The cookies may have insufficient flavor display and mouthmelt. Oil separation from the dough can also be a problem. Crumb-continuous dual-textured chocolate chip cookies frequently have appearance problems involving chocolate migration from the chips into the dough and excessive browning of the inner dough compared to the outer dough.

The emulsifier system of the present invention is meant to reduce the problems found in previous cookies involving texture, flavor, and appearance.

Several references describe the addition to baked goods of various emulsifiers. For example, U.S. Pat. No. 2,689,797, issued Sept. 21, 1954 to Joffe, discloses an emulsifier for yeast-leavened bread or dry shortenings comprising 0.1% to 1.0% diacetyl tartaric acid ester of monoglyceride, 0.05% to 1.5% monoglyceride, and polyglycerol esters.

U.S. Pat. No. 3,443,965, issued May 13, 1969 to Birnbaum, describes an emulsifier for use in baking yeast-raised products. The emulsifier comprises 30% distilled monoglyceride having an iodine value of about 40, 30% distilled monoglyceride having an iodine value of about 100, and 40% diacetyl tartaric acid ester of mono- or diglycerides.

U.S. Pat. No. 3,502,482, issued Mar. 24, 1970 to Birnbaum, discloses an emulsifier for yeast-raised baked goods (breads) comprising about 25% distilled monoglyceride, about 5% vegetable shortening, and about 1% diacetyl tartaric acid ester of monoglyceride.

Hutchinson et al., "Effect of Emulsifiers on the Texture of Cookies", *J. Food Sci.* 42, No. 2 (1977), disclose separately the effects on cookie texture of polyglycerol esters, diacetyl tartaric acid esters, and monoglycerides.

The use of diacetyl tartaric acid esters of monoglycerides in breads and other baked goods is described in U.S. Pat. No. 3,216,829, issued Nov. 9, 1965 to Hansen.

U.S. Pat. No. 3,268,337, issued Aug. 23, 1966 to Howard et al., describes an emulsifier for cakes. The emulsifier has three components: an alpha-phase crystal-tending emulsifier (preferably diglycerides), a polyvalent metal ion salt, and a high temperature batter stabilizer such as diacetyl tartaric acid ester of monoglyceride.

U.S. Pat. No. 4,374,863, issued Feb. 22, 1983 to Savage, discloses a nonadherent dough composition for baked goods, comprising: (a) sugar; (b) flour; (c) shortening; (d) 15-60%, by weight of the shortening, of water; and (e) sufficient emulsifier active at dough mixing temperatures to render the dough shortening continuous.

U.S. Pat. No. 4,360,534, issued Nov. 23, 1982 to Brabbs et al., describes a method in which high emulsifier levels and fluid shortening in baked good dough provide a shortening-continuous dough system, which markedly enhances shortening transfer in the baked goods. The fluid shortening readily transfers from the dough to the flavor chips, making their texture desirably soft during storage.

None of these references discloses the use of the emulsifier system of the present invention in cookies or suggests the advantages obtainable thereby. It has now been found that the present emulsifier system promotes a tender texture in cookies and provides flexibility in work input during dough formation. In combination with a preferred shortening it improves the flavor display and mouthmelt of cookies. It reduces chocolate migration and excessive browning of inner dough. the emulsifier system also provides benefits in the areas of cookie density and dough stability.

It is therefore an object of this invention to provide an emulsifier system for cookies that provides a more tender texture, improves flavor release and mouthmelt, and reduces chocolate migration and excessive browning.

It is another object of this invention to provide an emulsifier system for use with a particular shortening in crumb-continuous, dual-textured, crisp and chewy cookies.

These and other objects of this invention will become apparent by the description of the invention below.

All percentages are by weight unless otherwise defined.

SUMMARY OF THE INVENTION

The present invention is an emulsifier system for cookies comprising:

(a) from about 40% to about 100% (by weight, on the basis of monoglyceride content) fatty acid mono-diglycerides, said mono-diglycerides having from about 35% to about 99% fatty acid monoglycerides, and from about 1% to about 50% fatty acid diglycerides, wherein at least about 65% of said fatty acids are selected from the group consisting of $C_{14}$–$C_{20}$ saturated fatty acids and $C_{16}$–$C_{20}$ trans-unsaturated fatty acids and mixtures thereof;

(b) from about 0% to about 60% (by weight) fatty acid esters of polyols having an average of from about 4 to about 14 hydroxyl groups, wherein from about 10% to about 66% of the hydroxyl groups are esterified, and wherein at least about 65% of said fatty acids are selected from the group consisting of $C_{14}$–$C_{20}$ saturated fatty acids and $C_{16}$–$C_{20}$ trans-unsaturated fatty acids and mixtures thereof; and (c) from about 0% to about 60% (by weight) fatty acid monoglyceride esters of polycarboxylic acids and their derivatives, wherein at least about 65% of said fatty acids are selected from the group consisting of $C_{14}$–$C_{20}$ saturated fatty acids and mixtures thereof.

DETAILED DESCRIPTION OF THE INVENTION

The present invention provides an emulsifier system for use in cookies. The cookies can be traditional drop cookies or improved crumb-continuous dual-textured crisp and chewy cookies of the type described in U.S. Pat. No. 4,455,333, issued June 19, 1984 to Hong and Brabbs.

The emulsifier system produces benefits in such areas as texture, flavor display, mouthmelt and taste, dough stability, appearance, and density control. In summary, it is comprised of a combination of fatty acid mono-diglycerides, fatty acid esters of polyols, and fatty acid monoglyceride esters of polycarboxylic acids and their derivatives.

As used herein the terms "fatty acid monoglyceride" and "fatty acid diglyceride" means mixtures of the esters of glycerol and fatty acids. Monoglycerides contain one fatty acid chain attached to the glycerol and diglycerides contain two fatty acid chains. The term "fatty acid mono-diglyceride" as used herein means a mixture of fatty acid monoglycerides and fatty acid diglycerides, with minor amounts of triglycerides and free glycerol. While the triglycerides and free glycerol are present in minor amounts, they are not emulsifiers. Since the monoglyceride content of monodiglyceride can vary, the percentages of mono-diglyceride in the emulsifier system are given by weight on the basis of monoglyceride content.

The fatty acid mono-diglyceride component of this emulsifier system comprises from about 35% to about 99% fatty acid monoglycerides and from about 1% to about 50% fatty acid diglycerides, with small amounts of triglycerides and free glycerol. At least about 65% of the fatty acids are selected from the group consisting of $C_{14}$–$C_{20}$ saturated fatty acids and $C_{16}$–$C_{20}$ trans-unsaturated fatty acids and mixtures thereof. The most preferred trans-unsaturated fatty acids are $C_{18}$ trans-unsaturated. Preferably, from about 25% to about 85% of the total fatty acids are $C_{18}$ trans-unsaturated fatty acids and less than about 18% of the total fatty acids are selected from the group consisting of octadecadienoic acid and octadecatrienoic acid and mixtures thereof. Most preferably, from about 25% to about 70% of the total fatty acids are $C_{18}$ trans-unsaturated fatty acids and less than about 8% of the total fatty acids are selected from the group consisting of octadecadienoic acid and octadecatrienoic acid and mixtures thereof.

In general, the fatty acids are a major amount of saturated fatty acids or trans-unsaturated fatty acids, or a combination thereof. The melting point of the mono-diglyceride mixture will depend on the particular composition of the fatty acids. As one skilled in the art will recognize, the presence of a large amount of low melting cis-unsaturated fatty acids will depress the melting point of the mono-diglyceride mixture. The trans-isomers are higher melting and thus elevate the melting point of the mixture. Through multiple solvent crystal fractionation the cis and trans isomers of fatty acids can be partially separated by crystallizing out most of the intermediate-melting trans isomers. For the mono-diglycerides used herein it is preferred that the fatty acids be fractionated to be enriched in the intermediate-melting trans and cis-isomers and reduced in the lower melting cis isomers (for example for those having double bonds in the 5, 7, 9, and 11 positions of the fatty acid chain).

Even the position of the double bond within the fatty acid chain affects the melting point of the glyceride. The presence of large amounts of stearic acid mono- and diglycerides will elevate the melting point of the mono-diglyceride mixture since these materials melt higher than the corresponding palmitic acid and oleic acid esters. Because of its lower melting point, the level of octadecadienoic acid and octadecatrienoic acid, and the mixtures thereof, in the mono-diglyceride mixture should preferably be less than about 18%, and most preferably less than about 8%. The approximate melting point range of the fatty acid mono-diglyceride mixture will be between about 120° F. (48° C.) and about 150° F. (65° C.).

Preferably, from about 60% to about 90% of the fatty acids in the mono-diglycerides are selected from the group consisting of myristic, palmitic, stearic, and trans-octadecenoic acids, and mixtures thereof. Also preferred are mono-diglyceride compositions in which from about 10% to about 40% of the fatty acids are selected from the group consisting of myristic, palmitic, and stearic acids and mixtures thereof, and in which from about 2% to about 25% of the fatty acids are stearic acid. Most preferably, from about 2% to about 14% of the fatty acids are stearic acid.

This mono-diglyceride mixture is the key component in the emulsifier system for providing improved tenderness, improved mouthmelt, dissipation of the crumb, and other textural benefits in crumb-continuous cookies.

The fatty acid mono-diglycerides comprise from about 40% to about 100% of the emulsifier system by weight, on the basis of monoglyceride content. Preferably, the mono-diglycerides will be present in the amount of from about 50% to about 100% of the emulsifier, most preferably from about 70% to about 100% of the emulsifier.

A second component of the emulsifier system of the present invention comprises from about 0% to about 60% (by weight), preferably from about 0% to about 30%, most preferably from about 10% to about 30%, of fatty acid esters of polyols having an average of from about 4 to about 14 hydroxyl groups, wherein from about 10% to about 66% of the hydroxyl groups are esterified, and wherein at least about 65% of the fatty acids are selected from the group consisting of $C_{14}$–$C_{20}$ saturated fatty acids and $C_{16}$–$C_{20}$ trans-unsaturated fatty acids and mixtures thereof. The most preferred trans-unsaturated fatty acids are $C_{18}$ trans-unsaturated. Preferably, from about 25% to about 85% of the total fatty acids are $C_{18}$ trans-unsaturated fatty acids and less than about 18% of the total fatty acids are selected from the group consisting of octadecadienoic acid and octadecatrienoic acid and mixtures thereof. Most preferably, from about 25% to about 70% of the total fatty acids are $C_{18}$ trans-unsaturated fatty acids and less than about 8% of the total fatty acids are selected from the group consisting of octadecatrienoic acid and mixtures thereof.

The polyols preferred for use herein are carbohydrates and polyglycerols and mixtures thereof. The preferred carbohydrate is sucrose. Polyglycerols are prepared by the polymerization of glycerine in the presence of either acid or base. The polyglycerol compounds can be made by any synthetic method; see, for example, U.S. Pat. No. 3,968,169 issued to Seiden and Martin (1976). The method for making the polyglycerols is not critical to the present invention.

The polyols are reacted with fatty acids to produce fatty acid esters. The polyol has an average of from about 4 to about 14 hydroxyl groups, and preferably from about 4 to about 12 hydroxyl groups. Sucrose, for example, has eight hydroxyls. The polyol is esterified with fatty acids selected from the group consisting of $C_{14}$–$C_{20}$ saturated fatty acids and $C_{16}$–$C_{20}$ trans-unsaturated fatty acids and mixtures thereof. The fatty acids control both the melting point of the polyol ester and the functionality. For this reason, polyol fatty acid ester made from palmitic and stearic acids, and mixtures thereof, are preferred for use herein.

The polyglycerol esters must have an average of from about two to about twelve, and preferably from about three to about ten, glycerol units per polyglycerol moiety. The percentage of hydroxyl groups esterified with fatty acid is from about 10% to about 66%, and preferably from about 20% to about 50%.

The saponification value of the polyglycerol esters is preferably from about 55 to about 175, and most preferably from about 80 to about 160. Saponification value is used to characterize the polyglycerol esters by average molecular weight, which varies with average fatty acid chain length. The hydroxyl value of the polyglycerol esters is preferably from about 80 to about 600, most preferably from about 140 to about 460. The polyglycerol esters preferably contain less than about 20%, most preferably less than 15%, free polyglycerol.

The third component of the emulsifier system of the present invention, comprising from about 0% to about 60% (by weight) of the emulsifier system, preferably from about 0% to about 30%, most preferably from about 10% to about 30%, are fatty acid monoglyceride esters of polycarboxylic acids and their derivatives wherein at least about 65% of said fatty acids are selected from the group consisting of $C_{14}$–$C_{20}$ saturated fatty acids and mixtures thereof.

By "derivative" is meant a short chain ($C_2$ to $C_8$) fatty acid ester of a hydroxy di- or tricarboxylic acid. The preferred derivative is acetyl.

Examples of monoglyceride esters of polycarboxylic acids and their derivatives suitable for use herein are malic acid esters of monoglycerides, succinic acid esters of monoglycerides, tartaric acid esters of monoglycerides, citric acid esters of monoglycerides, maleic acid esters of monoglycerides, and their derivatives. Preferred esters are diacetyl tartaric acid esters of monoglycerides, citric acid esters of monoglycerides, and succinylated monoglycerides, and mixtures thereof. Most preferred are diacetyl tartaric acid esters of monoglycerides.

If diacetyl tartaric acid esters of monoglycerides are used in the third part of the emulsifier system, they must have an acid value of from about 60 to about 80 and a saponification value of from about 380 to about 430. Diacetyl tartaric acid esters of monoglycerides have a dual function in cookies because (a) they are surface active (i.e., they are effective food emulsifiers); and (b) they also function as leavening acids (i.e., they react with sodium bicarbonate to release carbon dioxide).

An optional ingredient in this emulsifier system is lecithin. The emulsifier system can additionally comprise from about 0.1% to about 20% vegetable oil lecithin (by weight). It is recognized in the art that lecithin can also be added in the form of egg yolks or other suitable means.

The emulsifier system of the present invention can be used to prepare improved crumb-continuous storage-stable dual-textured cookies of the type described in U.S. Pat. No. 4,455,333, issued June 19, 1984 to Hong and Brabbs. It is also useful in the cookies described in U.S. Pat. No. 4,344,969, issued Aug. 17, 1982, to Youngquist et al., and in U.S. Pat. No. 4,503,080, issued Mar. 5, 1985 to Brabbs et al. Youngquist et al. disclose incorporation of a carbohydrase into cookies dough to provide, via a special baking process, a cookie having a storage-stable texture which emulates that of freshly baked, home-style, drop-type cookies. Brabbs et al. describe a process of inhibiting sugar crystallization in parts of a cookie to make a cookie product having a storage-stable plurality of textures, comprising (1) discrete regions providing a stable, crisp texture, and (2) discrete regions providing a stable, chewy texture. The Hong and Brabbs U.S. Pat. No. 4,455,333 patent discloses cookies that have storage-stable crisp regions comprising readily crystallizable sugar and other typical cookie ingredients; and storage-stable chewy regions comprising crystallization-resistant sugar and other typical cookie ingredients.

The mono-diglyceride component alone provides most of the benefits of the emulsifier system and can be employed in dual textured cookies without the other components if desired. However, it is to be understood that any of the emulsifier components can be used alone in any of the doughs employed in making the dual textured cookies. Also, the individual emulsifier components can be combined in any manner for use in any doughs employed in making dual textured cookies. Also, the individual emulsifier components can be combined in any manner for use in any doughs employed in making dual textured cookies. The emulsifier is present in dual textured cookies at a level of from about 0.02% to about 5% by weight, preferably from about 0.15% to about 2.5% by weight.

It has been found that when all three of the emulsifier components are used in dual textured cookies, optimum results are obtained by using the entire system in the chewy cookie regions, and by using the mono-diglycerides, alone or with the fatty acid polyol esters, in the crisp cookie regions. In the latter case the mono-diglyceride or fatty acid polyol can comprise 0% to 100% of the emulsifier for the crisp cookie regions. The most preferred ranges for the emulsifier components in these cookies containing discrete chewy regions and discrete crisp regions are: (a) from about 70% to about 100% mono-diglycerides in the crisp regions, and from about 50% to about 100% of the mono-diglycerides in the chewy regions; (b) from about 0% to about 30% fatty acid esters of polyols in the crisp regions, and from about 10% to about 30% of the fatty acid esters of polyols in the chewy regions; and (c) 0% of the fatty acid esters of polycarboxylic acids in the crisp regions, and from about 10% to about 30% of the fatty acid esters of polycarboxylic acids in the chewy regions. In the chewy regions of these cookies the emulsifier can additionally comprise from about 0.1% to about 20% vegetable oil lecithin (by weight).

The dual-textured cookies in which this emulsifier system is particularly useful are preferably embodied by a sweetened food product prepared from a cookie dough preform, or the like, comprising a matrix made from typical cookie ingredients and being characterized and having distributed therein discrete regions containing readily crystallizable sugar and discrete regions containing crystallization-resistant sugar, whereby the product, when baked, provides a storage-stable plurality of textures, the regions containing crystallized sugar providing a crisp texture, and the regions containing crystallization-resistant sugar providing a chewy texture.

In its preferred execution, the cookie has a substantially homogeneous cross-section with respect to flavor and appearance and a shelf-stable cross-sectional texture variability typical of freshly baked cookies, made by the process of preparing at least one cookie dough from typical cookie ingredients containing a crystallization-resistant sugar or solution thereof, and preparing at least one distinct cookie dough, containing a readily crystallizable sugar or solution thereof also, and substantially enveloping said former doughs with an outer layer of at least one dough containing readily crystallizable sugar, thereby forming a ready-to-bake, laminated dough structure which is baked to provide a dual-textured cookie.

Crumb-continuous dual-textured cookies can be made according to the foregoing process, wherein any of the doughs further comprise a member selected from the group consisting of cereals, nutmeats, peanut butter, cocoa, raisins, chocolate chips, butterscotch chips, and mixtures thereof. Nutmeats include the whole or chopped meat of any edibel nut, including walnuts, black walnuts, hickory nuts, hazel nuts, brazil nuts, peanuts, macadamia nuts, pecans, almonds, cashews, and the like. Another nutmeat especially suitable for use in cookies is coconut.

The sugar component of the chewy cookie regions consists essentially of crystallization-resistant sugar or a solution thereof. By "crystallization-resistant sugar" is meant a mono- or disaccharide, or mixture of mono- and/or disaccharides, which crystallizes, at the water content and water activity encountered in the semimoist cookies of the home-baked type, substantially more slowly than sucrose under the same conditions, typically remaining uncrystallized for periods of at least 1-6 months. Particularly good crystallization-resistant sugars are fructose, dextrose, and mixtures of sugars of which fructose and dextrose together comprise at least about 15% by weight, and solutions thereof. Also highly preferred are mixtures of mono- and di-saccharides containing at least about 20% fructose by weight. Preferred forms of such mixtures include high-fructose corn syrup, invert sugar, and honey. Crystallization-resistant sugar as used herein also includes a combination of a readily crystallizable sugar with a crystallization inhibitor.

The sugar component of the crisp cookie regions consists essentially of a readily crystallizable sugar or solution thereof. Readily crystallizable sugars include sucrose and mixtures of sucrose and other mono- and disaccharides which comprise at least 75%, preferably at least 80%, most preferably at least 85% sucrose by weight.

By "crumb-continuous" is meant that the cookies have a predominantly uniform distribution of the ingredients throughout the cookie, e.g., oatmeal cookies, chocolate chip or Toll House TM cookies, peanut butter cookies, sugar cookies, and other drop-type cookies. This is in distinction to the filled, coated, and sandwich-type cookies known to the art.

"Monosaccharides" and "disaccharides" as used herein are compounds well known to the art. Monosaccharides have the empirical formula $(CH_2O)_n$, where n is greater than or equal to 3. The carbon skeleton of the common monosaccharides is unbranched and each carbon except one bears an —OH group; the remaining carbon is generally combined in an acetal or ketal linkage. Hexoses, both aldose and ketose forms, straight chain and pyranose or furanose forms, are preferred herein. The ketohexoses include psicose, fructose, sorbose, and tagatose. The aldohexoses include allose, altrose, glucose, mannose, gulose, idose, galactose, and talose.

Disaccharides consist of two monosaccharides joined by a glycosidic linkage. The most common disaccharides are maltose, lactose, and sucrose.

Several advantages accrue from the use of this emulsifier system in the dual-textured crumb-continuous cookies. These advantages include a tender texture, flexibility during processing, improved flavor display and mouthmelt, and reduction of chocolate migration and excessive browning.

When the viscosity of the outer dough of these dual-textured cookies containing readily crystallizable sugar is reduced during baking relative to doughs containing primarily crystallization-resistant sugar, the outer dough flows and concentrates at the cookie perimeter, thereby creating thicker outer dough regions at the edge. A crisp, tender rim around the perimeter of the cookie is produced. This concentration of crispness in the cookie perimeter has been found to simulate the texture of homemade Toll House TM cookies, the standard of excellence in chocolate chip cookies. The instant emulsifier system tenderizes the crumb texture, so that when the crisp region is concentrated at the outer edge the cookie perimeter remains crisp but tender and it does not become hard.

Another advantage of the use of this emulsifier system relates to work input into the dough during cookie preparation. If a cookie dough is overworked during forming and processing of the dough, the resulting baked cookie will usually contain more off-flavors and an undesirably tough texture. When the instant emulsifier system is used in the dough it allows greater flexibility in mixing time in that it permits adequate dispersion of the ingredients in the dough with much less of the resulting off-flavor and toughness.

The emulsifier system of the present invention in combination with a particular preferred shortening system improves the flavor display of the finished cookie product by causing enhanced dissipation of the cookie in the mouth with saliva. This enhanced flavor display and mouthmelt results in improved taste.

The emulsifier system of the present invention also helps to control the effect of variations in the composition of cookie flour. Adjustments could be made in the emulsifier system to offset these variations. Some of the variation in the flour comes from natural emuisifiers in the flour. Other flour components that are adjusted for include natural flour lipids.

Another advantage of this emulsifier system is its effectiveness in reducing chip bleed in chocolate chip cookies. Chip bleed occurs when chocolate from the chips migrates into the surrounding dough and darkens it in color. The instant emulsifier system sets up a stable water-continuous dough emulsion. There is less free oil in the dough available to dissolve the fat of the chocolate, so chocolate migration is reduced.

Crumb-continuous dual-textured cookies typically have portions of chewy dough containing primarily crystallization-resistant sugar and crisp dough containing primarily readily crystallizable sugar. Most crystallization-resistant sugars undergo browning reactions more than do crystallizable sugars. Excessive browning of the chewy dough during and after baking relative to the crisp dough detracts from the appearance of the cookie. The third component of the present emulsifier system reacts with the baking soda in the cookies to lower the pH of the chewy dough, thereby reducing excessive browning.

The emulsifier system also affects cookie density. This emulsifier system promotes gas nucleation and retention in the dough so that more air is entrapped during mixing, resulting in a lighter texture in the baked cookie. Density can be controlled by adjusting the level of emulsifier.

Dough stability during processing is enhanced by the emulsifier system through a physical interaction relating to starch complexing. The dough itself is an emulsion. The emulsifier system of the present invention stabilizes the dough emulsion and aids in preventing oil separation from the dough.

Lastly, the emulsifier is involved in leavening action in the dough. For example, the carboxylic acid and the acetic acid of a diacetyl tartaric acid ester of monoglyceride can react with the sodium bicarbonate (baking soda) in the dough to release carbon dioxide, thereby leavening (raising) the dough.

While the emulsifier of the present invention is particularly useful in dual-textured cookies, it can also be employed in traditional cookies having a single texture, such as all crisp or all soft and chewy. As used herein the term "soft and chewy cookies" denotes cookies which are uniformly soft or chewy in texture. These cookies are made from a single cookie dough containing typical cookie ingredients such as flour, sugar, shortening, water and leavening. The sugar component is a crystallization-resistant sugar. The preferred sugars are fructose, glucose (or dextrose) and mixtures of these sugars with sucrose or other mono- and disaccharides. Preferred sources of these sugars are corn syrup, high fructose corn syrup, honey, invert syrup and invert sugar. The term "crisp cookies" is used herein to denote cookies which are uniformly crisp in texture. These cookies are prepared from a single dough using typical cookie ingredients and contain sugar which is readily crystallizable, preferably sucrose.

When used in a soft and chewy cookie or a crisp cookie, the emulsifier should be present in the amount of from about 0.02% to about 5% (by weight) of the cookie. In these cookies the emulsifier should comprise from about 40% to about 90% mono-diglycerides, from about 5% to about 55% polyol esters, and from about 5% to about 55% polycarboxylic acid esters.

Many of the same advantages which accrue from use of this emulsifier system in dual-textured crumb continuous cookies also occur in soft and chewy cookies or crisp cookies. These include improved flavor display, work input flexibility during processing, control of variations in flour composition, lighter cookie density, tenderizing texture, enhanced leavening action, improved dough stability during processing, and reduction in excessive browning.

FORMULATION

Sugar, flour, water and shortening, when combined in almost any reasonable proportions, will produce a dough that can be baked to form a cookie—the classic "sugar cookie". Of course, the sweetness, texture and similar organoleptic properties of the cookie will depend upon the ratio of sugar/flour/water/shortening. In general, any cookie recipe which produces an organoleptically acceptable crumb-continuous cookie (as opposed to filled, iced and sandwich-type cookies) can be employed in the practice of the present invention. Some such recipes will incorporate additional ingredients. For example, oatmeal cookies generally contain rolled oats to provide their characteristic flavor and texture. Peanut butter cookies will, of course, contain peanut butter, which provides not only the distinctive flavor of peanut butter, but also oils (shortening) and peanut solids which supply both carbohydrates and proteins, similar to flour. Within limits, well known to the art, materials which "interrupt" the homogeneous composition of the typical cookie can be introduced into the formulation. These materials are essentially inert, so far as the chemistry of the cookie dough is concerned. Examples of such materials, referred to hereinafter as "inclusions", are chopped nuts, chocolate chips or Toll House TM morsels, coconut, butterscotch chips, oatmeal, peanut butter chips, raisins, and the like. Even in simple cookies, such as sugar cookies, it may be desirable to incorporate additional flavoring materials, such as spices.

By "typical cookie ingredients" is meant those ingredients common to virtually all cookies, namely, sugar, flour, water, and shortening, as well as those additional flavoring and texturing ingredients desired in the particular system being formulated. Such latter ingredients would include nutmeats, cereals, raisins, and chocolate chips, as well as egg, vanilla, cinnamon, cocoa, and the numerous other similar materials commonly found in cookies, as desired.

By "flour" is meant the finely comminuted meal of any cereal grain or edible seed. Typical non-limiting examples are wheat flour, barley flour, rye flour, corn starch and corn flour, but also encompassed by this term as used herein are the so-called synthetic flours, which incorporate such materials as starch and soy protein isolate, with or without heat and/or steam treatment.

By "shortening" is meant edible fats and oils suitable for baking, as well as combinations of edible fats and/or oils with appropriate known, typical food-grade emulsifiers. Also included are oleaginous products such as butter and margarine.

By "baking" herein is meant radiant, conductive, or convective exposure to energy of a type which imparts thermal energy to the product being baked. It thus includes conventional, convection, dielectric, and microwave oven baking.

COMBINATION OF THE INSTANT EMULSIFIER SYSTEM AND A PREFERRED SHORTENING

The emulsifier system of this invention works well with any shortening in cookies. However, in storage-stable dual-textured cookies the instant emulsifier system has been found to work best in combination with a new shortening disclosed in copending U.S. application Ser. No. 722,533 of Seiden, filed Apr. 12, 1985. This shortening system has a unique solids content index profile (SCI) versus temperature and a very low level of solids at about 92° F. and is essentially beta prime stable. A particular range of SCI profiles is obtained by blending up to 45% partially hydrogenated soybean oil or other low SCI oil into the shortening. The beta prime stability is attained by incorporating 2% to 80% hydrogenated cottonseed and/or palm oils into the shortening formulation. In preparing dual-textured cookies of the Hong et al. type, the dough containing primarily crystallization-resistant sugar contains from about 10% to about 30% of the beta prime stable shortening having an SCI at 21° C. of from about 14.0 to about 20.0 and an SCI at 33° C. of from about 0.0 to about 8.0. The dough containing primarily crystallization-resistant sugar contains from about 10% to about 30% of a beta prime stable shortening having an SCI at 21° C. of from about 12.0 to about 18.0 and an SCI at 33° C. of below about 2.0. Use of this shortening system in a dual-textured cookie results in an optimum mouthmelt and dissipation, flavor display, dough stability, and flavor and oxidative stability.

In order to obtain optimum mouthmelt, dissipation and flavor display, there should be virtually no solids in the shortening at mouth temperature. While the temperature of the human body is normally near 98.6° F., the mouth temperature while eating is generally slightly lower due to the inhalation of cooler air. Significant solids residue in the mouth at this temperature results in an undesirable grainy or pasty sensation. Furthermore, if the fat solids content at this temperature is too high, flavor release is inhibited, since the flavor is trapped within the fat solids and is unable to emulsify with the saliva properly. Use of shortenings having SCI values within the above ranges results in a cookie which has a crispy-chewy texture at first bite, but quickly melts in the mouth without leaving excess solids residue.

TEST METHODS

A. Trans-unsaturated Fatty Acids

The percentage of trans-unsaturated fatty acids is determined by the method described in a paper by Madison et al., "Accurate Determination of trans isomers in Shortenings and Edible Oils by infrared Spectrophotometry", *JAOCS*, Vol. 59, No. 4 (April 1982). Accurate measurements are obtained by using a 2-component calibration standard mixture and measuring the samples as methyl esters.

B. Hydroxyl Value

The hydroxyl value is determined using the method of *Official Methods and Recommended Practices of the American Oil Chemists Society*, 3rd Ed., 1984, Procedure Cd 4-40.

C. Saponification Value

The saponification value was determined using the method of *Official Methods and Recommended Practices of the American Oil Chemists Society*, 3rd Ed., 1984, Procedure Cd 3-25.

D. Fatty Acid Composition

The fatty acid composition was determined by gas-liquid chromatography of methyl esters using the method of *Official Methods and Recommended Practices of the American Oil Chemists Society*, 3rd Ed., 1984, Procedure Ce 1-62.

E. Iodine Value

The iodine value is a measure of saturation of the emulsifier. The higher the iodine value, the more unsaturated the emulsifier. The iodine value is determined by the following method:

The iodine value of lipid material is calculated from fatty acid composition data on the material. The iodine value by this method assumes that all lipid material which contributes to the iodine value is saponifiable. Any unsaponifiable material will not be reported in this procedure. The iodine value by this method assumes complete reaction of all unsaturation with iodine. This procedure calculates the iodine value by multiplying the percent composition of the unsaturated components by an appropriate factor and summing the results. To compensate for the fact that the iodine value by titration is performed on a triglyceride sample and this method is based on methyl esters, the calculation of iodine value from data generated by this method reports the iodine value as if it were done on the triglyceride.

The iodine value is defined as the grams of iodine which reacts with 100 g. of sample. This definition is the basis for the calculation of the factors which convert fatty acid composition data to an iodine value. As an example, assume the material is 100% methyl linoleate (C18:2) and calculate the iodine value.

$$IV \text{ (Iodine Value)} = \frac{100 \text{ g.}}{MW \text{ Triglyceride}} \times \text{Number of Double Bonds} \times MW \text{ Iodine}$$

MW = molecular weight.

F. Acid Value

Acid value is measured using the method of *Official Methods and Recommended Practices of the American Oil Chemists Society*, 3rd Ed., 1984, Procedure Cd 3a-63.

G. Solids Content Index

The solid content referred to hereinabove is expressed at different temperatures, in terms of a "Solids Content Index" (SCI) which is measured by what is essentially the test described in the Journal of the American Oil Chemists' Society, March 1954, Vol. XXXI, pp. 98–103.

The following examples are illustrative of the present emulsifier system but are not intended to be limiting thereof.

EXAMPLE 1

| Ingredients | Weight Percent |
| --- | --- |
| Outer Dough (First Dough) | |
| Shortening | 19.0 |
| Distilled monoglycerides | 0.6 |
| Water | 9.5 |
| Molasses | 1.5 |
| Baking soda | 0.5 |
| Sugar (sucrose) | 34.5 |
| Egg yolk solids | 1.0 |
| Flour | 32.5 |
| Salt | 0.7 |
| Starch | 0.1 |
| Egg white solids | 0.1 |
| Inner Dough (Second Dough) | |
| Shortening | 13.5 |
| Distilled monoglycerides | 0.4 |
| Polyglycerol esters | 0.1 |
| Diacetyl tartaric acid esters of monoglycerides | 0.1 |
| Water | 0.5 |
| Baking soda | 0.4 |
| High fructose corn syrup | 22.0 |
| Sugar | 9.0 |
| Flour | 23.1 |
| Salt | 0.5 |
| Starch | 1.3 |
| Egg white solids | 0.1 |
| Chocolate chips | 29.0 |

The outer dough was prepared by first mixing the water with the molasses and soda. The shortening and distilled monoglyceride were then added and the ingredients were mixed for 3 to 4 minutes. The sugar was then added and the ingredients mixed again. All the remaining ingredients were then mixed in, resulting in a 29.7 lb. batch of dough.

The inner dough was formed by mixing the ingredients in the following order: The high focus corn syrup and water were mixed, then the shortening, distilled monoglycerides, polyglycerol esters, and diacetyl tartaric acid esters of monoglycerides were added and mixed. The sugar was then added and mixed, and then the flour, other dry ingredients, and chocolate chips were mixed in.

The doughs were coextruded with a noncommercial double ram extruder. The extruder produces a two-dough, concentrically arranged rope. An equivalent coextruder can be employed such as a Rheon® encrusting machine, Model 207 available from Rheon Automotive Machinery Company of Japan, or coextruder Model No. DDP 200-9005, available from Bepex Hutt GmbH, Postfach 9, Daimlerstrasse 9, D-7105, Leingarten, West Germany. Then doughballs were formed weighing about 13.4 grams each. The doughballs were placed onto stainless steel trays and baked in a Middleby-Marshall Oven (Model JS250) at 305° F. for about 7.2 minutes to make cookies. The cookies were cooled, packaged, and stored.

The distilled monoglyceride component of the emulsifier system used in the doughs had the following characteristics:
Monoglyceride content-92.8%
Diglyceride content-3.5%
Melting point (approx.)-60° C. (140° F.)
Percentage of trans fatty acids: 61.5%
Fatty acid composition:

| Fatty acid | Percentage |
| --- | --- |
| $C_{16}$ | 9.9 |
| $C_{18}$ | 14.1 |
| $C_{18-1}$ | 72.5 |
| $C_{18-2}$ | 2.6 |
| $C_{20}$ | 0.4 |
| $C_{22}$ | 0.4 |

The polyglycerol ester component of the emulsifier composition had the following characteristics:
Average of 8 glycerol units per polyglycerol moiety.
Hydroxyl value-394.8
Refractive index (butyro 60° C.)-59.5
Fatty acid composition:
  64%±1.5% palmitic acid ($C_{16}$)
  34%±1.5% stearic acid ($C_{18}$)
Saponification value-about 96.7

The diacetyl tartaric acid ester of monoglyceride component of the emulsifier system was characterized as follows:
Saponification value-395–420
Acid value-62–76
Iodine value-maximum of 3
Melting point (approx.)-45° C. (113° F.)

The resulting cookies were evaluated by expert flavor panelists, qualitative descriptive analysis panelists, and taste test panelists. Compared to prior art dual-textured cookies which do not use the emulsifier system of the current invention, the resulting cookies had a crisp yet tender outer texture, and a chewy yet tender inner texture. The browning of the inner cookie during baking and in the days following baking was reduced so that inner and outer cookie portions were not distinguishable by color. Melting of chocolate chips into the inner portion of the cookie was also reduced.

| EXAMPLE 2 | |
| --- | --- |
| Ingredients | Weight Percent |
| Outer Dough (First Dough) | |
| Shortening | 18.63 |
| Polyglycerol esters | 0.28 |
| Whole eggs | 1.02 |
| Baking soda | 0.51 |
| Sugar (sucrose) | 35.09 |
| Flour | 32.79 |
| Starch | 0.50 |
| Salt | 0.63 |
| Water | 8.79 |
| Molasses | 1.51 |
| Egg white solids | 0.25 |
| Inner Dough (Second Dough) | |
| Shortening | 18.80 |
| Distilled monoglycerides | 0.66 |
| Polyglycerol esters | 0.14 |
| Diacetyl tartaric acid esters of monoglycerides | 0.19 |
| High fructose corn syrup | 30.82 |
| Whole eggs | 2.01 |
| Baking soda | 0.51 |
| Sugar (sucrose) | 12.49 |
| Flour | 31.73 |
| Starch | 2.24 |
| Salt | 0.41 |

The ingredients were mixed into doughs and baked into cookies as in Example 1, except that the doughballs were 12.7 grams. A Rheon® encruster Model 207 available from Rheon Automotive Machinery Company of Japan was used for the coextrusion.

The polyglycerol esters and diacetyl tartaric acid esters of monoglycerides used in Example 2 were the same as those described in Example 1. The distilled monoglycerides used in Example 2 had the following characteristics:
Monoglyceride content-93.5%
Diglyceride content-3.3%
Percentage of trans fatty acids-65.1%
Fatty acid composition:

| Fatty acid | Percentage |
| --- | --- |
| $C_{16}$ | 12.7 |
| $C_{18}$ | 6.7 |
| $C_{18-1}$ | 73.2 |
| $C_{18-2}$ | 2.6 |

Relative to the cookies of Example 1, upon evaluation by expert flavor panelists, the resulting cookies were slightly more tender in the outer portion made from the dough containing readily crystallizable sugar. This was due to the functionality of the polyglycerol esters added to the outer dough, even at a level lower than the distilled monoglycerides of Example 1. The inner portion texture was similar to that of Example 1.

| EXAMPLE 3 | |
| --- | --- |
| Ingredients | Wt. Percent |
| Outer Dough (First Dough) | |
| Shortening | 17.01 |
| Baking soda | 0.62 |
| White sugar (sucrose) | 20.21 |
| Brown sugar | 17.32 |
| Flour | 34.22 |
| Salt | 0.54 |
| Water | 9.01 |
| Crystalline dextrose | 0.82 |
| Egg white solids | 0.25 |
| Inner Dough (Second Dough) | |
| Shortening | 19.69 |
| Distilled monoglycerides | 0.22 |
| Sucrose esters | 0.13 |
| High fructose corn syrup | 31.46 |
| Whole eggs | 2.03 |
| Baking soda | 0.51 |
| White sugar (sucrose) | 12.18 |

-continued

EXAMPLE 3

| Ingredients | Wt. Percent |
|---|---|
| Flour | 31.26 |
| Salt | 0.28 |
| Starch | 2.24 |

The ingredients were mixed into dough and baked into cookies as in Example 2.

The distilled monoglycerides used in Example 3 had the following characteristics:
Percentage of trans fatty acids-53.1%
Free fatty acid content-8.6%
Monoglyceride content-89.3%
Fatty acid composition:

| Fatty acid | Percentage |
|---|---|
| $C_{16}$ | 15.1 |
| $C_{18}$ | 6.1 |
| $C_{18-1}$ | 74.0 |
| $C_{18-2}$ | 2.6 |

The sucrose fatty acid esters used in this example were commercial esters having the following specifications:
Hydrophilic/lipophilic Balance (HLB)-approximately 15
Approximately 70% palmitic acid esters
Approximately 30% stearic acid esters
Approximately 70% mono-esters
Approximately 30% di-, tri, and polyesters.

The resulting cookies, upon evaluation by expert flavor panelists and qualitative descriptive analysis panelists, were found to be very crunchy/hard in outer texture, due to the absence of any emulsifier in the outer dough. The inner texture was tender yet chewy, though slightly less tender than Example 1. Some inner cookie browning was noted several days after baking.

EXAMPLE 4

| Ingredients | Weight Percent |
|---|---|
| Outer Dough (First Dough) | |
| Shortening | 20.68 |
| Polyglycerol esters | 0.42 |
| Whole eggs | 0.99 |
| Water | 8.47 |
| Baking soda | 0.50 |
| Sugar (sucrose) | 34.45 |
| Flour | 32.13 |
| Salt | 0.62 |
| Molasses | 1.49 |
| Egg white solids | 0.25 |
| Inner Dough (Second Dough) | |
| Shortening | 20.79 |
| Distilled monoglycerides | 0.71 |
| Polyglycerol esters | 0.15 |
| Whole eggs | 1.99 |
| Water | 1.51 |
| High fructose corn syrup | 30.09 |
| Baking soda | 0.50 |
| Sugar (sucrose) | 12.04 |
| Flour | 29.53 |
| Starch | 2.19 |
| Salt | 0.50 |

The ingredients were mixed into dough and baked into cookies as in Example 2.

The distilled monoglycerides used in Example 4 had the following characteristics:
Monoglyceride content-95.5%
Diglyceride content-0.8%
Percentage of trans fatty acids-58.3%
Fatty acid composition:

| Fatty acid | Percentage |
|---|---|
| $C_{16}$ | 12.1 |
| $C_{18}$ | 6.5 |
| $C_{18-1}$ | 78.6 |
| $C_{18-2}$ | 2.6 |

The polyglycerol esters used in this example were the same as in Example 2.

The resulting cookies were evaluated by expert flavor panelists and had a very tender outer texture. The outer texture was more tender than Example 1; the outer portion of the cookie was crumbly to the touch. The inner portion of the cookie had a texture similar to that of Example 1.

What is claimed is:

1. An emulsifier composition for use in cookie dough containing crystallization-resistant sugar comprising:
   (a) from about 40% to about 90% by weight of the composition, on the basis of monoglyceride content, fatty acid mono-diglycerides having from about 35% to about 99% fatty acid monoglycerides, and from about 1% to about 50% fatty acid diglycerides, wherein at least about 65% of said fatty acids are selected from the group consisting of $C_{14}$-$C_{20}$ saturated fatty acids and $C_{16}$-$C_{20}$ trans-unsaturated fatty acids and mixtures thereof;
   (b) from about 5% to about 55% by weight of the composition of fatty acid esters of polyols having an average of from about 4 to about 14 hyroxyl groups, wherein from about 10% to about 66% of the hydroxyl groups are esterified, and wherein at least about 65% of said fatty acids are selected from the group consisting of $C_{14}$-$C_{20}$ saturated fatty acids and $C_{16}$-$C_{20}$ trans-unsaturated fatty acids and mixtures thereof; and
   (c) from about 5% to about 55% by weight of the composition of fatty acid monoglyceride esters of polycarboxylic acids and their derivatives, wherein at least about 65% of said fatty acids are selected from the group consisting of $C_{14}$-$C_{20}$ saturated fatty acids and mixtures thereof.

2. An emulsifier composition according to claim 1 comprising:
   (a) from about 40% to about 90% by weight of the composition, on the basis of monoglyceride content, of fatty acid mono-diglycerides having from about 35% to about 99% fatty acid monoglycerides, and from about 1% to about 50% fatty acid diglycerides, wherein at least about 65% of said fatty acids are selected from the group consisting of $C_{14}$-$C_{20}$ saturated fatty acids and $C_{18}$ trans-unsaturated fatty acids and mixtures thereof;
   (b) from about 5% to about 55% by weight of the composition of fatty acid esters of polyols having an average of from about 4 to about 14 hydroxyl groups, wherein from about 10% to about 66% of the hydroxyl groups are esterified, and wherein at least about 65% of said fatty acids are selected from the group consisting of $C_{14}$-$C_{20}$ saturated fatty acids and $C_{18}$ trans-unsaturated fatty acids and mixtures thereof; and (c) from about 5% to about 55% by weight of the composition of fatty acid monoglyceride esters of polycarboxylic acids and their derivatives, wherein at least about 65% of said fatty acids are selected from the group consisting of $C_{14}$–$C_{20}$ saturated fatty acids and mixtures thereof.

3. An emulsifier composition according to claim 2 wherein from about 25% to about 85% of the fatty acids of the mono-diglycerides and the polyol esters are $C_{18}$ trans-unsaturated fatty acids, and wherein less than about 18% of the fatty acids of the mono-diglycerides and the polyol esters are selected from the group consisting of octadecadienoic acid and octadecatrienoic acid and mixtures thereof.

4. An emulsifier composition according to claim 3 wherein from about 25% to about 70% of the fatty acids of the mono-diglycerides and the polyol esters are $C_{18}$ trans-unsaturated fatty acids, and wherein less than about 8% of the fatty acids of the mono-diglycerides and the polyol esters are selected from the group consisting of octadecadienoic acid and octadecatrienoic acid and mixtures thereof.

5. An emulsifier composition according to claim 2 wherein from about 60% to about 90% of the fatty acids of the mono-diglycerides are selected from the group consisting of myristic, palmitic, stearic, and trans-octadecenoic acids, and mixtures thereof.

6. An emulsifier composition according to claim 5 wherein from about 10% to about 40% of the fatty acids of the mono-diglycerides are selected from the group consisting of myristic, palmitic, and stearic acids and mixtures thereof, and wherein from about 2% to about 25% of the fatty acids of the mono-diglycerides are stearic acid.

7. An emulsifier composition according to claim 6 wherein from about 2% to about 14% of the fatty acids of the mono-diglycerides are stearic acid.

8. An emulsifier composition according to claim 2 wherein the polyol esters are selected from the group consisting of partial esters of polyglycerol and sucrose, and mixtures thereof.

9. An emulsifier composition according to claim 8 wherein the polyol esters are polyglycerol esters having an average of from about 2 to about 12 glycerol units per polyglycerol moiety, and wherein from about 10% to about 66% of the hydroxyl groups of the polyglycerol esters are esterified.

10. An emulsifier composition according to claim 9 wherein from about 20% to about 50% of the hydroxyl groups of the polyglycerol esters are esterified.

11. An emulsifier composition according to claim 9 wherein the polyglycerol esters have a saponification value of from about 55 to about 175, a hydroxyl value of from about 80 to about 600, and less than about 20% free polyglycerol.

12. An emulsifier composition according to claim 11 wherein the polyglycerol esters have a saponification value of from about 80 to about 160, a hydroxyl value of from about 140 to about 460, and less than about 15% free polyglycerol.

13. An emulsifier composition according to claim 2 wherein the fatty acid monoglyceride esters of polycarboxylic acids and their derivatives are selected from the group consisting of diacetyl tartaric acid esters of monoglycerides, citric acid esters of monoglycerides, succinylated monoglycerides and mixtures thereof.

14. An emulsifier composition according to claim 13 wherein the fatty acid monoglyceride esters are diacetyl tartaric acid esters of monoglycerides having an acid value of from about 60 to about 80 and a sponification value of from about 380 to about 430.

15. An emulsifier composition according to claim 2 additionally comprising from about 0.1% to about 20% vegetable oil lecithin.

16. An emulsifier composition according to claim 2 wherein the fatty acid mono-diglycerides comprise from about 50% to about 90% of the composition by weight.

17. An emulsifier composition according to claim 2 wherein the fatty acid esters of polyols comprise from about 5% to about 30% of the composition by weight.

18. An emulsifier composition according to claim 2 wherein the fatty acid monoglyceride esters of polycarboxylic acids and their derivatives comprise from about 5% to about 30% of the composition by weight.

* * * * *